US 11,153,418 B2

(12) United States Patent
Martinez et al.

(10) Patent No.: US 11,153,418 B2
(45) Date of Patent: *Oct. 19, 2021

(54) WIRELESS VEHICULAR COMMUNICATIONS WITH DYNAMIC-BASED RELATIONSHIPS

(71) Applicant: NXP B.V., Eindhoven (NL)

(72) Inventors: Vincent Pierre Martinez, Roques (FR); Alessio Filippi, Eindhoven (NL); Michael Andrew Fischer, San Antonio, TX (US)

(73) Assignee: NXP B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/669,694

(22) Filed: Oct. 31, 2019

(65) Prior Publication Data
US 2020/0162587 A1    May 21, 2020

(30) Foreign Application Priority Data
Nov. 15, 2018  (EP) ..................................... 18306492

(51) Int. Cl.
| G06F 15/173 | (2006.01) |
| H04L 29/06 | (2006.01) |
| H04W 4/40 | (2018.01) |
| H04L 1/00 | (2006.01) |
| H04L 5/00 | (2006.01) |
| H04L 29/08 | (2006.01) |

(Continued)

(52) U.S. Cl.
CPC .............. *H04L 69/18* (2013.01); *H04L 1/008* (2013.01); *H04L 5/0007* (2013.01);
(Continued)

(58) Field of Classification Search
CPC ..... H04L 69/18; H04L 5/0044; H04L 5/0007; H04L 5/0094; H04W 4/40
See application file for complete search history.

(56) References Cited

U.S. PATENT DOCUMENTS 9,271,241 B2    2/2016  Kenney et al.
9,344,238 B2    5/2016  Vermani et al.
(Continued)

OTHER PUBLICATIONS

Non-final office action dated Mar. 12, 2021 in U.S. Appl. No. 16/711,707.
(Continued)

*Primary Examiner* — Umar Cheema
*Assistant Examiner* — Tesfu N Mekonen (57) ABSTRACT

Aspects of the disclosure are directed to methods and apparatuses for wireless vehicular communications involving the transmission of messages using two or more protocols. As may be implemented in accordance with one or more embodiments characterized herein, wireless station-to-station communications are carried out in which a plurality of stations share a wireless communications channel. Information is wirelessly collected respectively from transmissions associated with a legacy communication protocol and another type of communication protocol. A current communication environment of the station is dynamically discerned and characterizes a dynamic relationship of the collected information using the legacy communication protocol relative to the collected information using the other communication protocol. Communications are wirelessly transmitted over the wireless communications channel using the legacy and other communication protocols, by allocating usage of the channel through transmissions of data, via the legacy communication protocol and via the other communication protocol, based on the dynamic relationship.

20 Claims, 6 Drawing Sheets

(51) Int. Cl.
   *H04W 28/06* (2009.01)
   *H04W 52/26* (2009.01)
   *H04W 52/34* (2009.01)
   *H04W 84/12* (2009.01)

(52) U.S. Cl.
   CPC .......... *H04L 5/0044* (2013.01); *H04L 5/0094* (2013.01); *H04L 67/12* (2013.01); *H04W 4/40* (2018.02); *H04W 28/06* (2013.01); *H04W 52/267* (2013.01); *H04W 52/346* (2013.01); *H04W 84/12* (2013.01)

(56) References Cited

U.S. PATENT DOCUMENTS

| | | | |
|---|---|---|---|
| 10,820,348 B2 * | 10/2020 | Khoryaev | ............... H04W 4/46 |
| 2009/0116427 A1 | 5/2009 | Marks et al. | |
| 2009/0323614 A1 * | 12/2009 | Wang | .................... H04L 5/0048 370/329 |
| 2010/0309834 A1 * | 12/2010 | Fischer | ................. H04L 5/0064 370/312 |
| 2016/0234313 A1 * | 8/2016 | Kellner | ................... H04L 69/08 |
| 2017/0251339 A1 | 8/2017 | Addepalli et al. | |
| 2018/0176058 A1 * | 6/2018 | Kim | ....................... H04L 5/0048 |
| 2018/0191470 A1 | 7/2018 | Manolakos et al. | |
| 2018/0219701 A1 | 8/2018 | Seo et al. | |
| 2020/0228247 A1 | 7/2020 | Guo et al. | |
| 2020/0228949 A1 | 7/2020 | Bharadwaj et al. | |
| 2020/0229171 A1 | 7/2020 | Khoryaev et al. | |
| 2021/0014656 A1 | 1/2021 | Mueck et al. | |

OTHER PUBLICATIONS

Notice of Allowance dated Sep. 1, 2021 in U.S. Appl. No. 16/711,707.

* cited by examiner

WIRELESS VEHICULAR COMMUNICATIONS WITH DYNAMIC-BASED RELATIONSHIPS

CROSS-REFERENCE TO RELATED APPLICATIONS

This application claims the priority under 35 U.S.C. § 119 of European Patent application no. 18306492.2, filed on 15 Nov. 2018, the contents of which are incorporated by reference herein.

OVERVIEW

Aspects of various embodiments are directed to apparatuses and methods for providing wireless vehicular communications based on a dynamic relationship between the use of two (or more) protocols.

Wireless communications such as those involving vehicle-to-everything (V2X) communications are used to pass information from a vehicle to another entity, and vice versa. As vehicles (e.g., stations) employing V2X can be moving, V2X communications can form an ad-hoc network when two or more V2X devices (stations) come within each other's range. V2X communications can be provided using different types of technology which utilize communications protocols for providing wireless vehicular communications. While V2X communications have been useful, it can be challenging to implement different types of such communications, such as those involving different protocols. For instance, communications standards may evolve or change in different environments.

These and other matters have presented challenges to efficiencies of wireless vehicular communications implementations, for a variety of applications.

SUMMARY

Various example embodiments are directed to issues such as those addressed above and/or others which may become apparent from the following disclosure, as may relate to vehicular communications circuitry and related wireless communications involving different protocols.

As may be implemented in accordance with one or more embodiments, a method involving wireless station-to-station communications in which each of a plurality of stations shares a wireless communications channel is carried out as follows. In communications circuitry specific to a station participating in the station-to-station communications, information is wirelessly collected respectively from transmissions associated with a legacy communication protocol and from transmissions associated with another communication protocol. A current communication environment of the station is dynamically discerned, in which the current communication environment characterizes a dynamic relationship of the collected information using the legacy communication protocol relative to the collected information using the other communication protocol. Communications are wirelessly transmitted from the communications circuitry over the wireless communications channel using the legacy communication protocol and using the other communication protocol (or multiple other communication protocols), by allocating usage of the channel through transmissions of data (e.g., via the other communication protocol, which may include communications discernable via the legacy communication protocol) based on the dynamic relationship. In various contexts, such station-to-station communications may involve a station in a traditional vehicle (e.g., an automobile) and another station that may be an automobile, truck, rail car, roadside infrastructure device, human, drone or other communications resource as may be implemented in V2X type communications. In certain embodiments, the other communication protocol may involve a set (e.g., super-set) of protocols that include the legacy protocol, in which the other protocol may run in a full backwards compatible manner by sending communications using the legacy communication protocol (e.g., using only legacy communication protocol).

As may be implemented in accordance with one or more embodiments, an apparatus is implemented for wireless station-to-station communications in which each of a plurality of stations shares a wireless communications channel. The apparatus includes communications circuitry specific to a station participating in the station-to-station communications, and transmission circuitry. The communications circuitry is configured and arranged to collect information wirelessly respectively from transmissions associated with a legacy communication protocol and from transmissions associated with another communication protocol. The communications circuitry is further configured and arranged to dynamically discern a current communication environment of the station that characterizes a dynamic relationship of the collected information using the legacy communication protocol relative to the collected information using the other communication protocol. The transmission circuitry is configured and arranged to wirelessly transmit communications from the communications circuitry over the wireless communications channel using the other communication protocol (and including aspects of the legacy communication protocol). Specifically, the transmission circuitry allocates usage of the channel through transmissions of data, via the legacy communication protocol and via the other communication protocol, based on the dynamic relationship.

In certain example embodiments, aspects of the present disclosure involve vehicular communications circuitry that uses a communications protocol and operates using a different protocol (e.g., updated or newer standard or set of specifications), relative to communications protocols used by other communications circuitry. The vehicular communications circuitry can be implemented in a variety of types of devices, such as vehicles, drones, trains, mobile phones, tablets, user wearable devices, roadside infrastructure (e.g., as may include traffic control circuitry), and other types of devices. Such communication may involve the transmission of data using different protocols within a common communication (e.g., data packet), based on the use of such protocols in the environment in which the data is transmitted. For instance, a message may be broadcasted by vehicular communications circuitry of a device for asynchronous reception by other circuitry in different devices (e.g., as may be implemented in vehicles or other stations) configured to wirelessly communicate according to different communications protocols.

In certain embodiments, one or more apparatuses as characterized herein include vehicular communications circuitry in different vehicles and/or stations. One or both vehicular communications circuitry communicate in accordance with approaches characterized herein, with two or more protocols being used in transmitting a communication to two or more receivers using different types of protocols.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving wireless vehicular communications, such as may be carried out using different protocols. In certain implementations (e.g., embodiments), aspects of the present disclosure have been shown to be beneficial when used in the context of transmitting wireless communications using different protocols, based on a dynamic relationship between such protocols as present in an environment in which the transmissions are made. While not necessarily so limited, various aspects may be appreciated through the following discussion of non-limiting examples which use exemplary contexts.

In more specific embodiments, a communication environment is discerned in a manner that characterizes a dynamic relationship between information collected (e.g., received communications) from different communication protocols. This dynamic relationship may change, for example, as different types of devices that communicate using different ones of the protocols enter or leave the environment. The dynamic relationship is then used to allocate channel usage relative to the respective protocols indicated via the collected information. This allocation can thus change over time to suit a changing environment (e.g., the environment of a vehicle as it travels). For instance, where a series of symbols may be communicated in a given transmission period, the number of symbols allocated to modulation and coding defined for the respective communication protocols can be dynamically changed, based on discerned environmental conditions such as may involve the number of other devices in the environment that communicate with each protocol, the number of messages pertaining to each protocol, or the time used to communicate via respective protocols. In this context, transmissions in accordance with a new/other communication protocol may include symbols allocated to a legacy protocol.

In the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Figure 5:
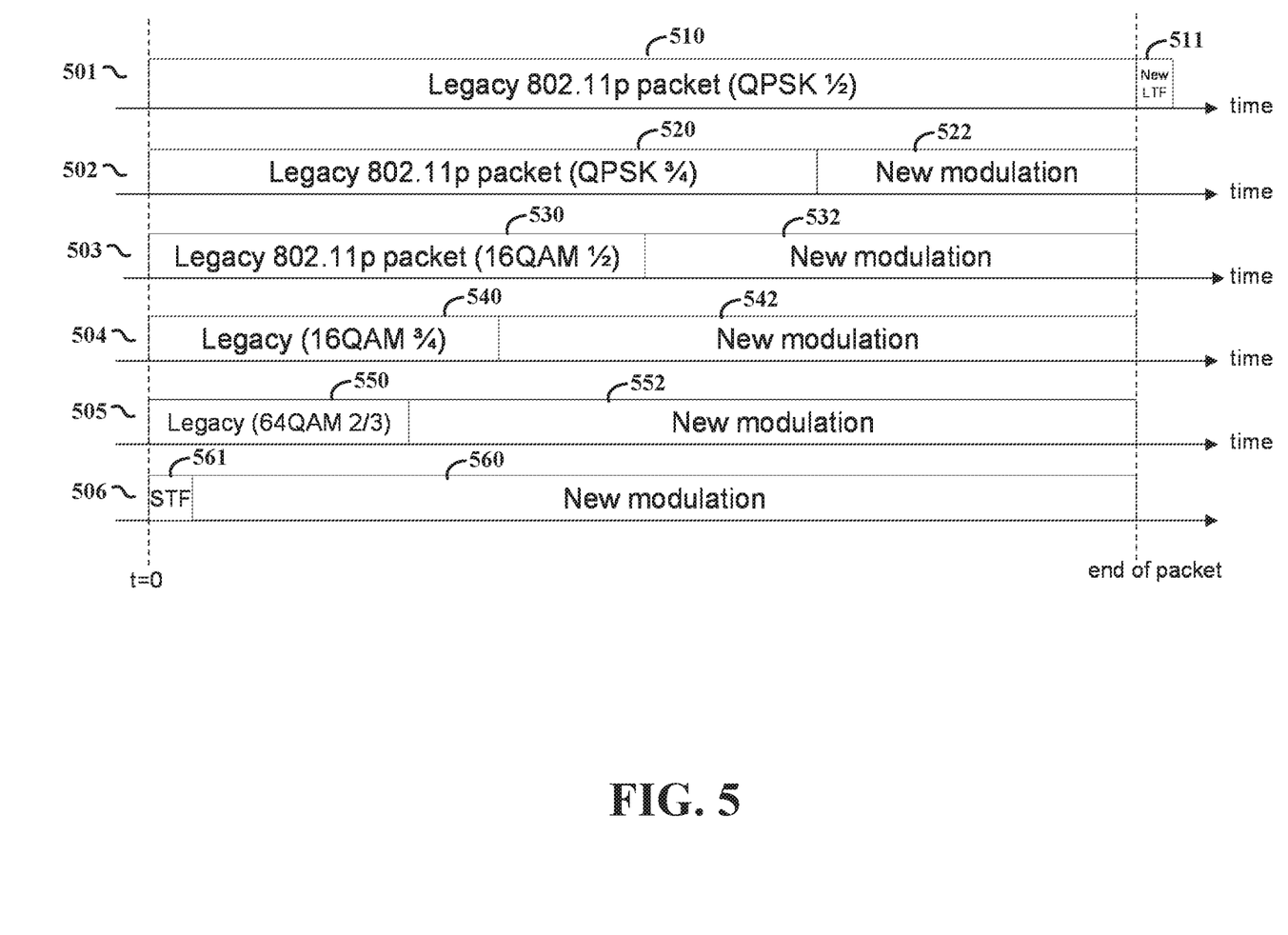
FIG. 5 illustrates respective communication states as may be set in accordance with a dynamic relationship of information collected using respective communication protocols, in accordance with one or more embodiments.

Vehicles, such as automobiles, trains or boats, and other stations/devices which may be in dynamic communication environments (e.g., in which some communications circuits are moving relative to one another), can include communications circuitry for wirelessly communicating with other vehicles and/or circuitry using a communication protocol, sometimes herein referred to as vehicle-to-everything (V2X) communications. In such contexts, some exemplary implementations can utilize wireless communications in accordance with IEEE 802.11p, or as otherwise specified in the IEEE 802.11-2016 specification, which is fully incorporated herein by reference (e.g., for implementation of communication protocols and approaches with FIGS. 1-2, or modulation as shown in FIG. 5). The label 802.11p is sometimes used throughout the text referring to when the dot11OCBActivated is set to true enabling communication outside the context of a BSS in IEEE 802.11-2016.

Figure 4:
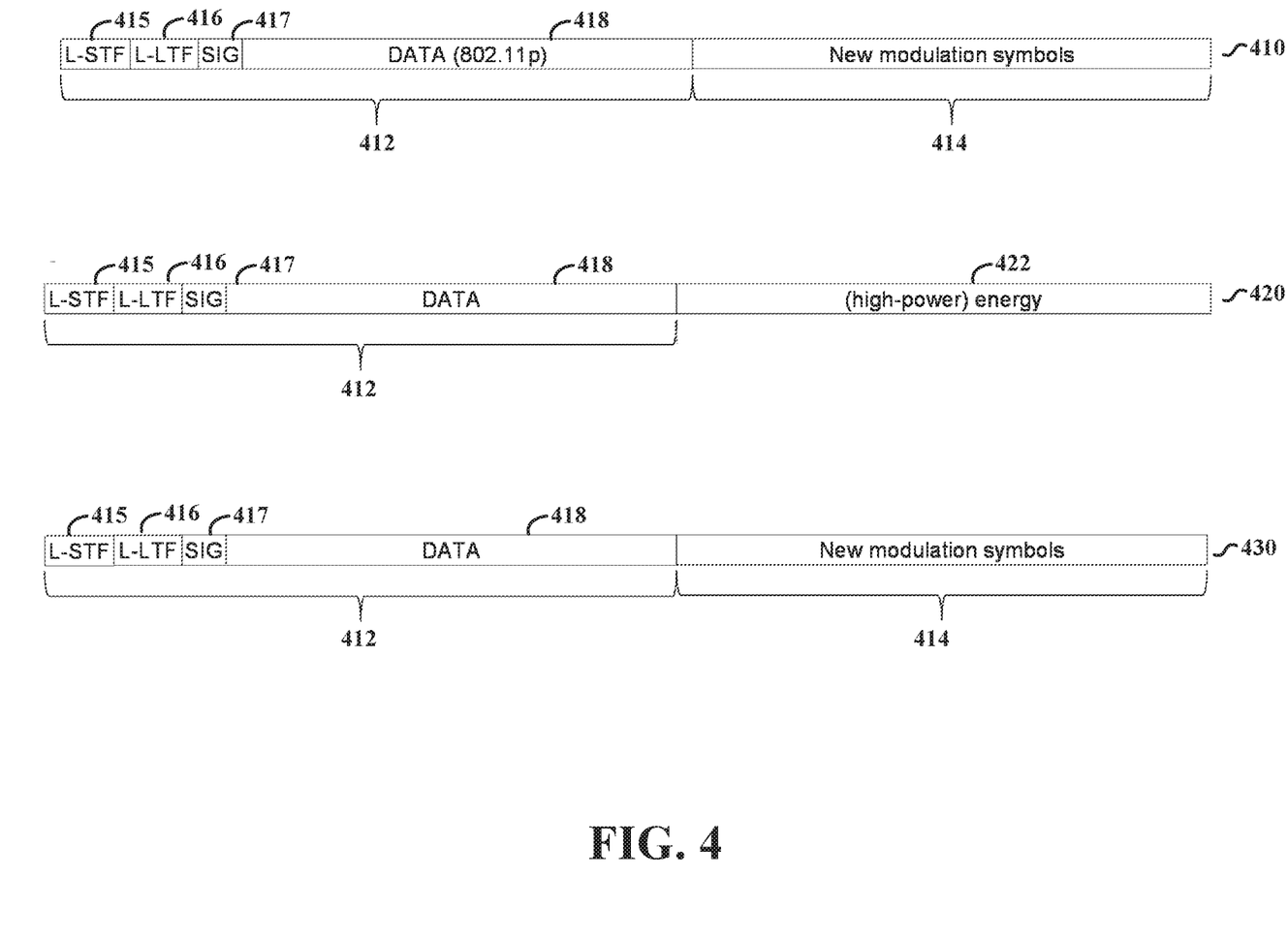
FIG. 4 illustrates an example data communication and reception approach for different types of receivers, in accordance with one or more embodiments.

In certain example embodiments, communications approaches herein utilize protocols as specified in Section 21.3.2 (VHT PPDU format) of the IEEE, 802.11-2016 specification, as may include aspects depicted in FIG. 21-4 and Tables 21-4 and 21-30. Such VHT (very high throughput) PPDU (physical layer (PHY) protocol data unit) can thus be implemented using various types of modulation as shown in Table 21-30, with communication fields as shown in Table 21-4 and as communicated via symbols shown in FIG. 21-4.

As an example, a vast number of automobile-type vehicles that are currently in the field, and/or are about to be, communicate with one another via wireless communications (transmitter/receiver) circuits installed in respective vehicles using one or more protocols that accommodate the transitory operation of the vehicles. As a more specific example, such communications can be implemented using one or more of a protocol including a control channel, limited range communications (e.g., less than a few kilometers), open-access networks (e.g., involving ad-hoc communications that operate without an otherwise available communications infrastructure such as a cellular network), short-time communications intervals (e.g., less than 1 second, less than 500 ms or less than 100 ms), and/or communications capable of handling high speeds between stations of up to 500 km/h relative to one to another. Such vehicles may use a control channel of the V2X band that can include a 10 megahertz (MHz) chunk of the spectrum in the 5.9 gigahertz (GHz) range. As the lifetime of vehicles can be twenty years or more, V2X systems are in the field for a range (e.g., long) time, which can impact the ability to make improvements to wireless communications provided according to the standard. Further, a newer standard may not be implemented or compatible with the existing standard. Embodiments in accordance with the present disclosure can include use of a newer standard that is interoperable with an older standard, and that provides improvement to system-level performance. Certain such embodiments involve appending data symbols of the newer standard after data symbols of the older standard, within a common communication. The number/time of symbols communicated in this regard can be tailored to suit the environment.

As a specific example, a new generation vehicle (NGV) standard and/or a 3GPP 5G NR standard can be used to improve system level performance, relative to a protocol standard such as IEEE 802.11p, for communication in an intelligent transportation system, when used in accordance with one or more embodiments herein. The NGV features improve the overall system effectiveness, including the "legacy 802.11p" devices. As may be appreciated, legacy devices include or refer to devices in the field that provide V2X using an older standard, such as 802.11p. The newer standard is backwards compatible with the older standard, in order to avoid having two groups of devices (e.g., the legacy 802.11p devices and NGV devices) that are incompatible with each-other while in the field. For example, the newer standard or set of specifications can define a communications protocol that is a superset of protocols, hence possible to use the same or otherwise compatible with devices operating according to the older standard or set of specifications. Accordingly, allocating communications involving legacy communications as characterized herein may be implemented by setting a number, length, or other characteristic of data communicated via a new/other protocol to include data that is discernable by stations utilizing the legacy protocol. The newer standard may improve performance of devices operating on both the newer and older standards by improving a range and/or reliability of messages communications and/or spectral efficiency (e.g., by sending similarly robust signals that are shorter in time, allowing for more transmitters). Performance may be facilitated by dynamically modifying the allocation of symbols or some physical layer parameters of symbols such as OFDM (orthogonal frequency division multiplexing) symbols conveying user data, such as modulation and coding scheme (sometimes referred to as transmit rate). Such parameters may be used for communicating under respective protocols based on the number of such communications and/or such devices making such communications with each respective protocol.

As may be implemented in accordance with one or more embodiments, wireless vehicle-to-vehicle (such as V2X) communications are carried out in an environment in which each of a plurality of stations (e.g., vehicles) shares a wireless communications channel. Such a channel and related communications may be carried out utilizing an ad-hoc wireless communications network in which transmissions are broadcast for asynchronous receptions by circuitry in one or more devices. Communications circuitry in a vehicle or other station that participates in the vehicle-to-vehicle communications operates to wirelessly collect information from transmissions associated with a legacy communication protocol and from transmissions associated with another communication protocol. Such transmissions may, for example, emanate from different transmitters operating on different vehicles and/or devices.

A current communication environment of the vehicle is dynamically discerned such that the communication environment characterizes a dynamic relationship of the collected information using the legacy communication protocol relative to the collected information using the other communication protocol. This may, for example, characterize a number of transmitters in the environment (e.g., within a range of the vehicle) that respectively operate using a legacy protocol relative to another protocol. This may also (or in the alternative) characterize a number of transmissions using the respective protocols or the amount of time utilized for transmissions using the respective protocols.

Communications are wirelessly transmitted from the communications circuitry over the wireless communications channel using the legacy communication protocol and the other communication protocol, by allocating usage of the channel through transmissions of data (via the other communication protocol, as may include aspects of the legacy communication protocol) based on the dynamic relationship. For instance, usage of the channel can be allocated according to a ratio of the number of transmitters using the respective protocols, which may vary as dynamically discerned while the environment undergoes changes (e.g., as the vehicle and other vehicles/devices move). In some implementations, a common data set using both the legacy communication protocol and the other communication protocol may be transmitted in this regard.

Accordingly, dynamically discerning the current communication environment may include dynamically characterizing numbers of transmitters or messages in the environment that respectively utilize the legacy communication protocol and that utilize the other communication protocol as the as the environment changes. Usage of the channel may be allocated by dynamically allocating data symbols to the legacy communication protocol and to the other communication protocol in accordance with the dynamically characterized number of transmitters or messages using the respective protocols. Such an approach may involve utilizing a ratio of a number of transmitters or messages in the environment that communicate via the respective protocols, by allocating data symbols to the legacy communication protocol and to the other communication protocol based on such a ratio. The ratio may thus pertain to a number of transmitters that respectively communicate with the legacy or other communication protocols, or based a number of messages that respectively utilize the legacy or other communication protocol.

In accordance with certain embodiments, dynamically discerning a current communication environment includes characterizing an environmental condition corresponding to one or more of: a number of transmitters using the legacy communication protocol; a number of messages using the legacy communication protocol; a number of transmitters using the other communication protocol; a number of messages using the other communication protocol; the amount of time used for transmission of messages using the legacy communication protocol; the amount of time used for transmission of messages using the other communication protocol; noise; speed of the vehicle; geographic location of the environment, and type of vehicle from which the transmissions emanate. With respect to geographic location, certain communication protocols may be set by local governing bodies and are followed accordingly with the transmissions as characterized herein. Further, collecting information wirelessly may involve information from transmitters associated with a vehicle-to-vehicle transmission sources including one or more of an automobile, a train, a drone, a bicycle, a boat, a person, road side unit, and a traffic controller. In certain implementations, collecting information in this regard includes ascertaining that no other transmissions are being made within a particular environment (e.g., within range of a receiver), under which conditions transmissions may be generated using both legacy and new protocols (e.g., in anticipation of a station of unknown protocol use entering the environment). In various implementations, one or more such devices (such as vehicles) in a communications environment include at least one vehicle having communications circuitry that transmits over the wireless communications channel using the legacy communication protocol and at least one vehicle having communications circuitry that transmits over the wireless communications channel using the other communication protocol. Transmissions using the legacy communication protocol and transmissions using the other communications protocol are both received, and a common payload is transmitted to the respective vehicles using the legacy communication protocol and to vehicles using the other communication protocol.

Usage of the channel may be allocated in a number of manners. In some embodiments, data symbols of the legacy communication protocol and data symbols of the other communication protocol are temporally positioned based on the dynamic relationship. For instance, data symbols of the legacy communication protocol may be temporally positioned at the beginning of a communication with data symbols of another communication protocol temporally positioned after the data symbols of the legacy communication protocol (e.g., appended thereto). The amount of time for each set of symbols may be allocated based on the dynamically discerned environment, by adapting settings such as modulation and coding scheme (sometimes referred to as transmit rate). As may be consistent herewith, a first portion of data symbols in the communication may be allocated to a header and payload for a legacy communication protocol, and a second portion of data symbols in the communication can be allocated to a header and payload for the other communication protocol.

In a particular embodiment, numbers of transmissions in the environment that respectively use the legacy communication protocol and use the other communication protocol are characterized along with numbers of transmitters in the environment that respectively use the legacy communication protocol and use the other communication protocol, and data symbols are allocated to the legacy communication protocol and to the other communication protocol based on the numbers of transmissions and the numbers of transmitters using the respective protocols. This approach may involve, for example, allocating data symbols to the legacy communication protocol and to the other communication protocol by associating the transmissions with respective ones of the transmitters based on information in the transmissions and allocating the data symbols based on the number of transmitters. For instance, a transmitter identification (ID) may be included with communications therefrom and used to ascertain which communications are emanating from a particular transmitters. As such, a number of transmitters may be discerned, relative to various transmissions from those transmitters, using the respective transmitter IDs. For instance, a particular transmitter may transmit multiple times during a transmission period, while other transmitters may transmit fewer (or one) time during the same period. Ascertaining which transmissions come from particular transmitters allows discerning the number of transmitters.

In a further embodiment, usage of a channel as characterized above includes transmitting a communication having a first protocol data unit (e.g., PPDU) of the legacy communication protocol and a second protocol data unit (e.g., PPDU) of the other communication protocol. In some implementations, the respective first and second protocol units are successively transmitted with a configurable gap in time between the units. In other implementations, the number of messages sent using the first protocol and the number of messages sent using the second protocol are respectively controlled based on the dynamically discerned communication environment.

As may be implemented in accordance with various embodiments, a legacy communication protocol may also be utilized with the other/another communication protocol as characterized herein. For instance, different sets of symbols that both utilize the legacy communication protocol (e.g., each having header and payload) may be transmitted in a common message.

As may be implemented in accordance with one or more embodiments, an apparatus is implemented for wireless vehicle-to-vehicle communications in which each of a plurality of vehicles shares a wireless communications channel. The apparatus includes communications circuitry specific to a vehicle participating in the vehicle-to-vehicle communications, and transmission circuitry. The communications circuitry is configured and arranged to collect information wirelessly respectively from transmissions associated with a legacy communication protocol and from transmissions associated with another communication protocol. The communications circuitry is further configured and arranged to dynamically discern a current communication environment of the vehicle that characterizes a dynamic relationship of the collected information using the legacy communication protocol relative to the collected information using the other communication protocol. The transmission circuitry is configured and arranged to wirelessly transmit communications from the communications circuitry over the wireless communications channel using the legacy communication protocol and using the other communication protocol. Specifically, the transmission circuitry allocates usage of the channel through transmissions of data, via the legacy communication protocol and via the other communication protocol, based on the dynamic relationship. For instance, data symbols of the legacy communication protocol and data symbols of the other communication protocol may be temporally positioned in a common communication based on the dynamic relationship.

The communications and transmission circuitry can be implemented in a variety of manners. In some embodiments, the communications circuitry dynamically discerns a current communication environment by dynamically characterizing numbers of transmitters or messages in the environment that respectively utilize the legacy communication protocol and that utilize the other communication protocol. This can be carried out as the as the environment changes, such as when the vehicle moves and/or when other vehicles or devices enter or leave the environment. In such embodiments, the transmission circuitry dynamically allocates data symbols to the legacy communication protocol and to the other communication protocol in accordance with the dynamically characterized number of transmitters or messages using the respective protocols. This may involve adjusting the relationship of the collected information using the legacy communication protocol relative to the collected information using the other communication protocol.

In certain embodiments, the communications circuitry dynamically discerns the current communication environment by characterizing a number of transmitters or messages in the environment that communicate via the legacy communication protocol, and characterizing a number of transmitters or messages in the environment that communicate via the other communication protocol. The transmission circuitry allocates a ratio of data symbols to the legacy communication protocol and to the other communication protocol. The allocation may be based on a ratio of the number of transmitters that communicate with the legacy communication protocol to the number of transmitters that communicate using the other communication protocol, or based on a ratio of the number of messages that utilize the legacy communication protocol to the number of messages that utilize the other communication protocol (or both ratios).

The communications circuitry may characterize a variety of environmental conditions, including one or more of: a number of transmitters using the legacy communication protocol; a number of messages using the legacy communication protocol; a number of transmitters using the other communication protocol; a number of messages using the other communication protocol; noise; speed of the vehicle; geographic location of the environment, and type of vehicle from which the transmissions emanate.

Figure 1:
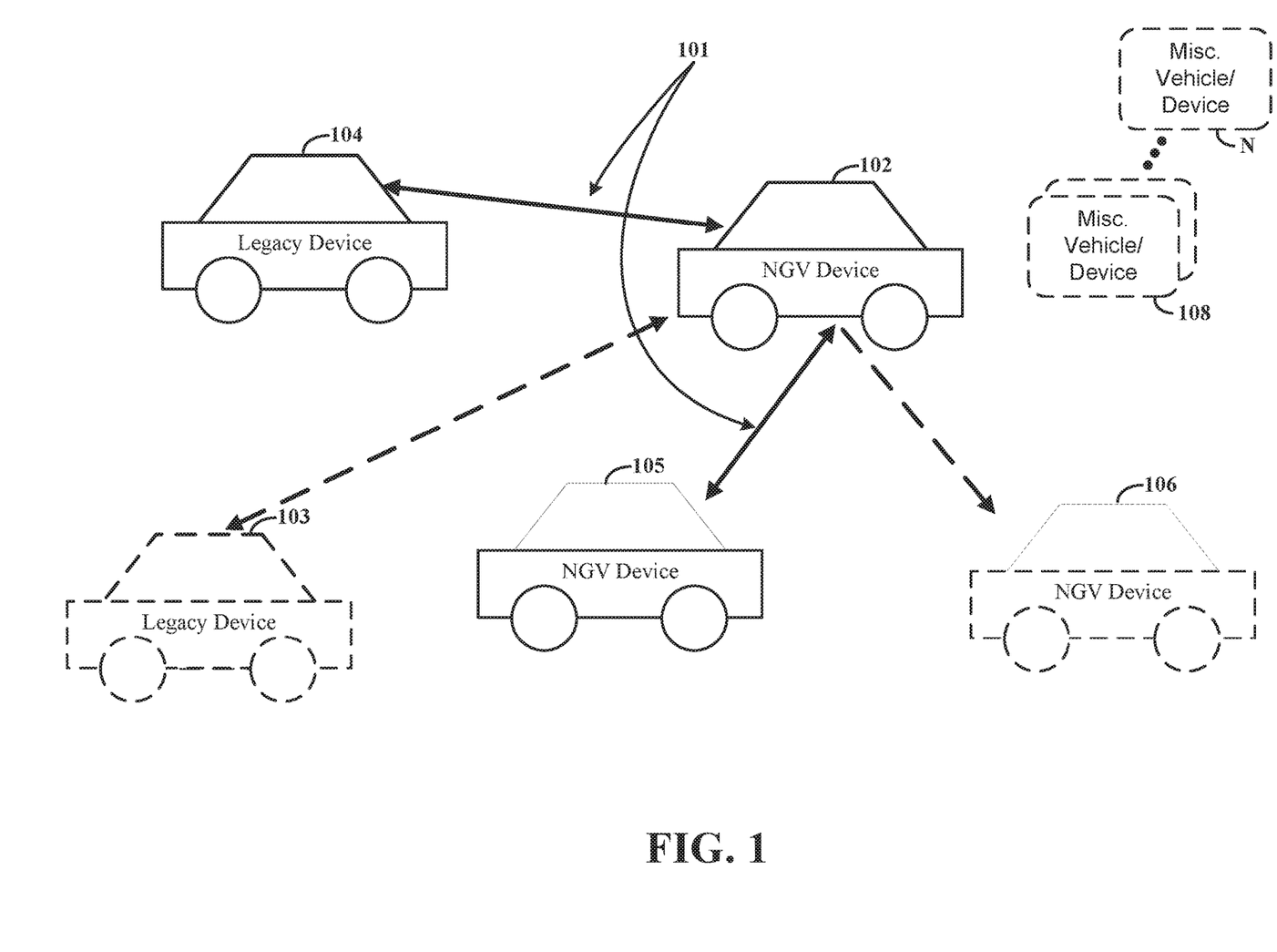
FIG. 1 illustrates an example wireless communications network, in accordance with the present disclosure.

Turning now to the figures, FIG. 1 illustrates an example wireless communications approach involving dynamically-used channels (101), in accordance with the present disclosure. A plurality of vehicles 102-107 as well as miscellaneous vehicles/devices 108-N (e.g., stations) are shown, some or all of which may participate in communications, and one or more of which include communication circuitry that communicates using one or more protocols in accordance with one or more embodiments as characterized herein. In the context of various embodiments, the vehicles and/or miscellaneous vehicles/devices may include automobiles, trains, boats, bicycle and/or pedestrian devices (e.g., mobile telephones or wearables), or non-mobile devices such as may be implemented with road side units or traffic controllers (e.g., stoplights, gates, bridges, and train crossings).

In a particular embodiment, vehicle 102 communicates with vehicles operating using different protocols, including vehicle 104 operating with a legacy communication protocol and vehicle 105 operating with another (e.g., NGV) communication protocol. Vehicle 102 may also operate in more populated environments involving one of more of vehicles 103 and/or 106 and miscellaneous vehicles/devices 108-N. Communication circuitry in vehicle 102 collects information wirelessly respectively from transmissions associated with the legacy communication protocol (at least from vehicle 104) and from transmissions associated with another communication protocol (at least from vehicle 105) over a particular wireless communications channel. Other transmissions according to the legacy communication protocol may be received from vehicle 103 or one or more of miscellaneous vehicle/devices 108-N. Further transmissions according to the other (e.g., NGV or 3GPP 5G NR) communication protocol may be received from vehicle 106 or one or more of miscellaneous vehicles/devices 108-N, some or all of which may also communicate via the legacy communication protocol. The communication circuitry in vehicle 102 dynamically discerns a current communication environment of the vehicle that characterizes a dynamic relationship of the collected information using the legacy communication protocol relative to the collected information using the other communication protocol. Such an approach may, for example, involve determining numbers of vehicles in the environment respectively using the legacy or other communication protocols, determining a number of communications associated with each respective protocols, or both. An environment in this context may pertain to a communication range of several meters to a few kilometers. The communications circuitry wirelessly transmits data over the wireless communications channel using the legacy communication protocol and using the other communication protocol, by allocating usage of the channel through transmissions of data via both communication protocols based on the dynamic relationship. For instance, transmissions may be allocated such that a first portion of each communication is allocated to the legacy communication protocol and the remaining portion of the communication is allocated to another (e.g., NGV or 3GPP 5G NR) communication protocol.

The wireless communications depicted in FIG. 1 may involve V2X communications, which may include multiple types of communications such as: vehicle-to-vehicle (V2V), vehicle-to-infrastructure (V2I), vehicle-to-network, (V2N) and vehicle-to-pedestrian (V2P). In specific instances, a V2X network may enable an exchange of information between a plurality of vehicles and, in some instances, other devices. As may be appreciated, as used herein "circuitry" refers to one or more circuits, such as a plurality of similarly-operating (or version of) circuits operating in respective vehicles, one or more of which may involve programmable devices utilizing software. The vehicles can communicate messages to one another, such as speed measurements, communication measurements, GPS data, etc., via the vehicular communications circuits. In various embodiments, this additional data is also used in allocating communications to respective protocols, such as to prioritize vehicles that are closer geographically or operating at higher rates of speed. Vehicles may use V2V for a variety of use cases, such as emergency electronic brake light, emergency vehicle approaching notification, train approaching notification or collision avoidance but not limited thereto, where both parties of the communication have circuitry equipped on different vehicles. Accordingly, where FIG. 1 or (other embodiments herein) refer to vehicles or vehicular communications, such communications as shown in FIG. 1 of otherwise can include a plurality of different types of devices such as those characterized herein, each having vehicular-type communications circuitry used to provide V2X communications. In this context, the term "vehicular" in vehicular communications circuitry and/or vehicular communications apparatuses is not intended to be limiting to vehicle devices, but rather indicates or refers to circuitry and/or apparatuses used to provide vehicular-type communications, such as V2X communications.

Different vehicles and other types of devices may utilize different technologies for performing V2X communications that operate using communications protocols. Many vehicles presently use IEEE 802.11p, with a number of vehicles in the field, or about to be in the field, using such technology. Consistent with the above discussion, such devices may herein be referred to as legacy devices, which can include or refer to legacy 802.11p devices, or other older protocols in use. Newer standards may be implemented that have improved features over the older standard, such as features that improve a robustness of the physical layer stack, which in turn can cause or otherwise lead to an extended range of communication between circuits. It can be advantageous to have the newer standard compatible with the older standard so that newer standard devices and older standard devices can communicate. As noted above, the older standard devices may be in the field for twenty or more years and it can be difficult to provide updates to all vehicles (or other types of devices) in the field.

The communication protocol technologies characterized herein, including legacy and other/NGV technologies, may be IEEE 802.11-based technology, such as IEEE 802.11p or other Wi-Fi technology. Referring to FIG. 1, each of the newer standard and older standard devices/vehicles may thus be implemented with communications circuitry that wirelessly communicates using a communications protocol that is consistent with Wi-Fi or 802.11p-based communications. The communications protocols used may involve sending messages asynchronously. For example, communications circuitry can observe (e.g., listen) the channel and communicate in response to the channel being clear (e.g., no messages being transmitted).

Figure 2:
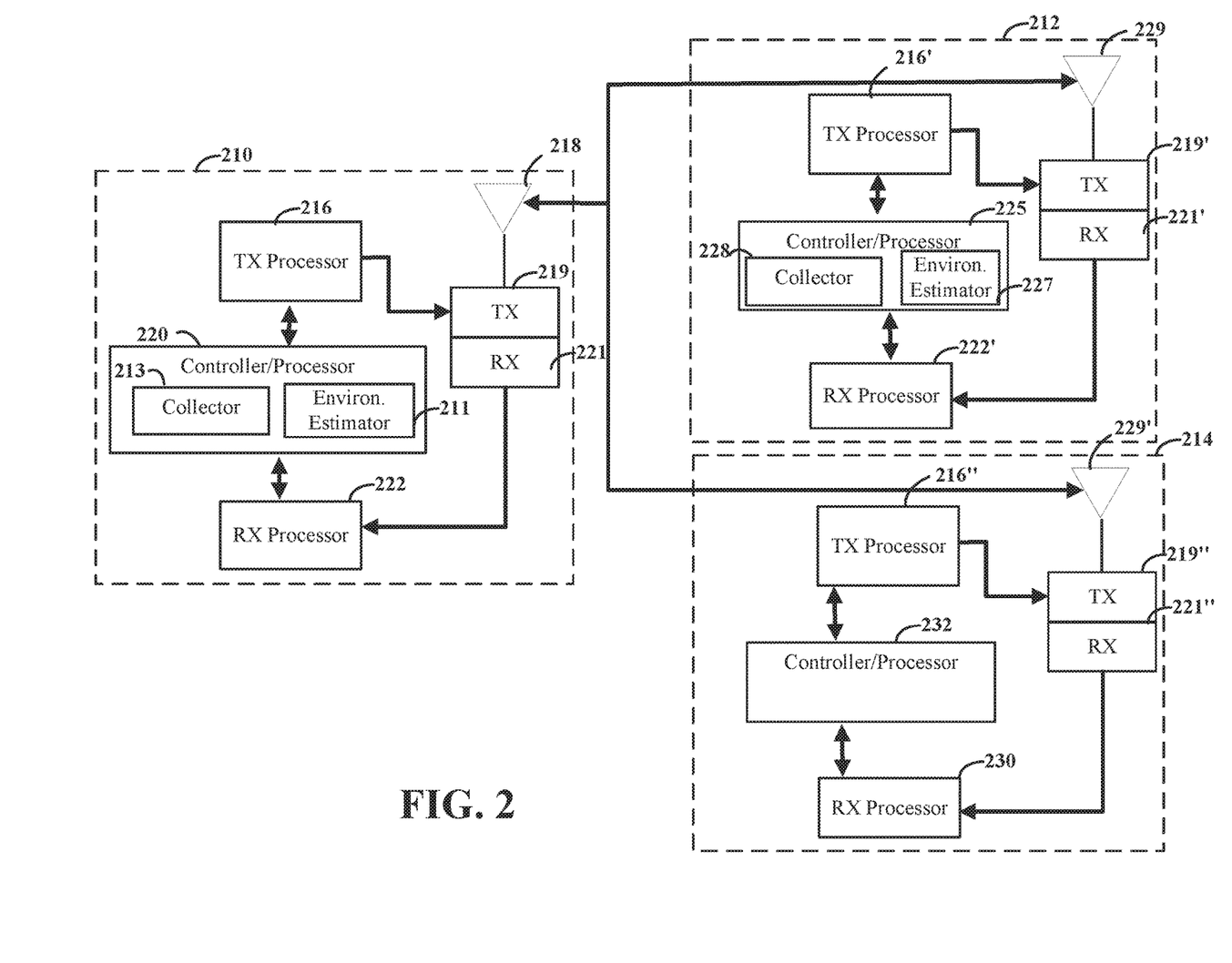
FIG. 2 illustrates example vehicular communications circuitry of a plurality of devices, in accordance with various embodiments.

FIG. 2 illustrates example communications circuitry of a plurality of stations, in accordance with various embodiments. Each of the communications circuitries 210, 212, 214 (stations) can communicate wirelessly in a wireless communications network using a communications protocol by transmitting data over a channel, which is received by other circuitry in a shared device geography/communication environment. More specifically, FIG. 2 illustrates first communications circuitry 210 and second communications circuitry 212 that operate according to a newer/other standard and third communications circuitry 214 that operates according to an older/legacy standard. Multiple additional communication circuits can be implemented, such as may involve a multitude of automobiles and/or other stations in an environment.

The communications circuitries 210, 212, 214 include certain common circuitry types as may be implemented similarly. The first communications circuitry 210 includes a transmit (TX) processor 216 and receive (RX) processor 222 used with a controller/processor 220 to implement various functionality for transmitting and receiving messages in accordance with both legacy and newer/other communication protocols. The first communications circuitry 210 also includes transmitter 219, receiver 221, and antenna 218. The controller/processor 220 includes a collector 213 that collects information about messages and/or a number of transmitters in the environment that respectively involve legacy or new/other communication types, and/or time used to transmit messages of legacy or new/other types. The controller/processor 220 also includes an environmental estimator 211 that uses the collected information to characterize the environment relative to the use of the respective protocol types, which can then be used by transmission circuitry in transmitting communications having data therein allocated in accordance with the respective protocols. For instance, such an approach may involve allocating a number of symbols or time to respective sets of data pertaining to each respective protocol as communicated in a common communication. In various contexts, the controller/processor 220 is configured to facilitate communications having a portion thereof allocated to a legacy protocol, with an appended portion allocated to another/new protocol, consistent with the approach shown in FIG. 3 and described herein.

The second communications circuitry 212 is shown with similar functionality to that first communications circuitry 210, for processing and transmitting signals of both protocols, while third communications circuitry 214 is shown with controller/processor 232 operable to transmit and receive signals in accordance with the legacy protocol. The second communications circuitry 212 also includes a controller/processor 225, environmental estimator 227, collector 228, and antenna 229. As such, first communications circuitry 210 and second communications circuitry 212 are backwards compatible for communicating with third communications circuitry 214. As more or fewer types of vehicles or other stations employing legacy communications are present in an environment, the first communications circuitry 210 and second communications circuitry 212 alter their allocation. If no legacy vehicles/stations are present, the first communications circuitry 210 and second communications circuitry 212 may operate using all communication allocation for the other/new protocol, thus allowing for phase-out of the legacy communication protocol. Allocation in this manner may, for example, be carried out in accordance with FIG. 5 and the related discussion herein. For ease of reference, certain ones each of the first communications circuitry 210 components, which include at least one communications circuit, are described, although as may be appreciated, each of the communications circuitries 210, 212, 214 may include similar components, with certain differences in controller/processors as shown in which controller/processors of the legacy type are depicted at controller/processor 232. For instance, second communications circuitry 212 includes related circuitry 216', 219', 221', and 222', and the third communications circuitry 214 includes related circuitry 216", 219", and 221".

In various implementations, the TX processor 216 can map to signal constellations based on various modulation schemes (e.g., binary phase-shift keying, quadrature phase-shift keying, and M-phase-shift-keying). The coded and modulated symbols are mapped to an orthogonal frequency-division multiplexing (OFDM) subcarrier and used to produce a physical channel carrying a time domain OFDM symbol stream. The stream is provided to the antenna 218 via a transmitter (TX) 219. The receiver (RX) 221 receives a signal through the antenna 218. It is noted that, although FIG. 2 illustrates single antennas for each communications circuit, embodiments are not so limited and can include separate RX and TX antennas and/or different antennas for different streams. The RX 221 recovers data modulated onto the RF carrier and provides the data to the RX processor 222, which may perform spatial processing on the data to recover spatial streams (e.g., an OFDM data symbol stream). The RX processor 222 converts the OFDM data symbol stream from the time-domain to the frequency domain using a Fast Fourier Transform (FFT) and uses the same to recover data and control signals which are provided to the controller/processor 220. The controller/processor 220 processes data received in the data messages.

Similarly to that described above, the third communications circuitry 214, which operates in accordance with the older/legacy standard, includes a TX processor 216" and an RX processor 230 used to implement various functionality for transmitting and receiving messages in accordance with the communications protocol, e.g., an IEEE 802.11-based protocol as may involve Wi-Fi and/or IEEE 802.11p. Data messages are provided by the TX processor 216" to the antenna 229' for wirelessly communicating data via the TX 219". The RX 221" receives a signal through the antenna 229' and provides recovered data to the RX processor 230, similarly to that described above. The RX processor 230 converts the data stream to recover the data and provides the same to the controller/processor 232. The controller/processor 232 processes data received in data messages.

Each of the first, second, and third communications circuitries 210, 212, 214 may communicate wirelessly using a communications protocol in which messages are sent asynchronously and over the same channel. The messages can each have a preamble that includes a legacy short training field (L-STF) that provides support of synchronization and automatic gain control (AGC) calibration (e.g., which can be 16 μsec), a legacy long training field (L-LTF) that provides channel estimation pilot for decoding subsequent Wi-Fi-based symbols (e.g., 802.11p OFDM symbols and which can be 16 μsec), and a signal field (SIG) symbol that conveys the MCS (e.g., which can be 8 μsec).

As a specific example, the first communications circuitry 210 may broadcast messages (e.g., once/second or ten times/second) for asynchronous receptions by other circuitry (including the second and third communications circuitry 212, 214) having both legacy and another/new protocol. Such a communications may be implemented such that the allocation of symbols/space in the communications to the respective protocols, such as may involve certain modulation and coding schemes or transmit rates, is dynamically modified over time as the environment changes, in accordance with the detected communications from other circuitry in the environment. Where 3GPP 5G NR communications are used, the new/other section of communications can be adapted, based on metrics such as those used for NGV, by changing the subcarrier spacing (hence the OFDM symbols time duration), which may be accomplished without changing modulation and coding schemes. The second communications circuitry 212 receives and processes the communications in accordance with the other/new protocol (and may also process the portion of the communications allocated to legacy communications). The third communications circuitry 214 processes the communications in accordance with the legacy protocol (e.g., ignoring appended data pertaining to the new/other protocol). Such an approach may, for example, be implemented in accordance with FIG. 4 and the corresponding discussion herein.

As may be appreciated, communications (and as may be applicable, communication networks) are not limited to the number of stations and/or communications circuitries as illustrated by FIGS. 1 and 2. Various embodiments can include greater or fewer stations having communications circuitries in a shared device geography, and additional or fewer types of stations having communications circuitries (e.g., mobile phones). The number of stations can also change over time due to movement of vehicles or other stations and/or additional stations entering the shared station geography (e.g., forming ad-hoc network(s)).

Figure 3:
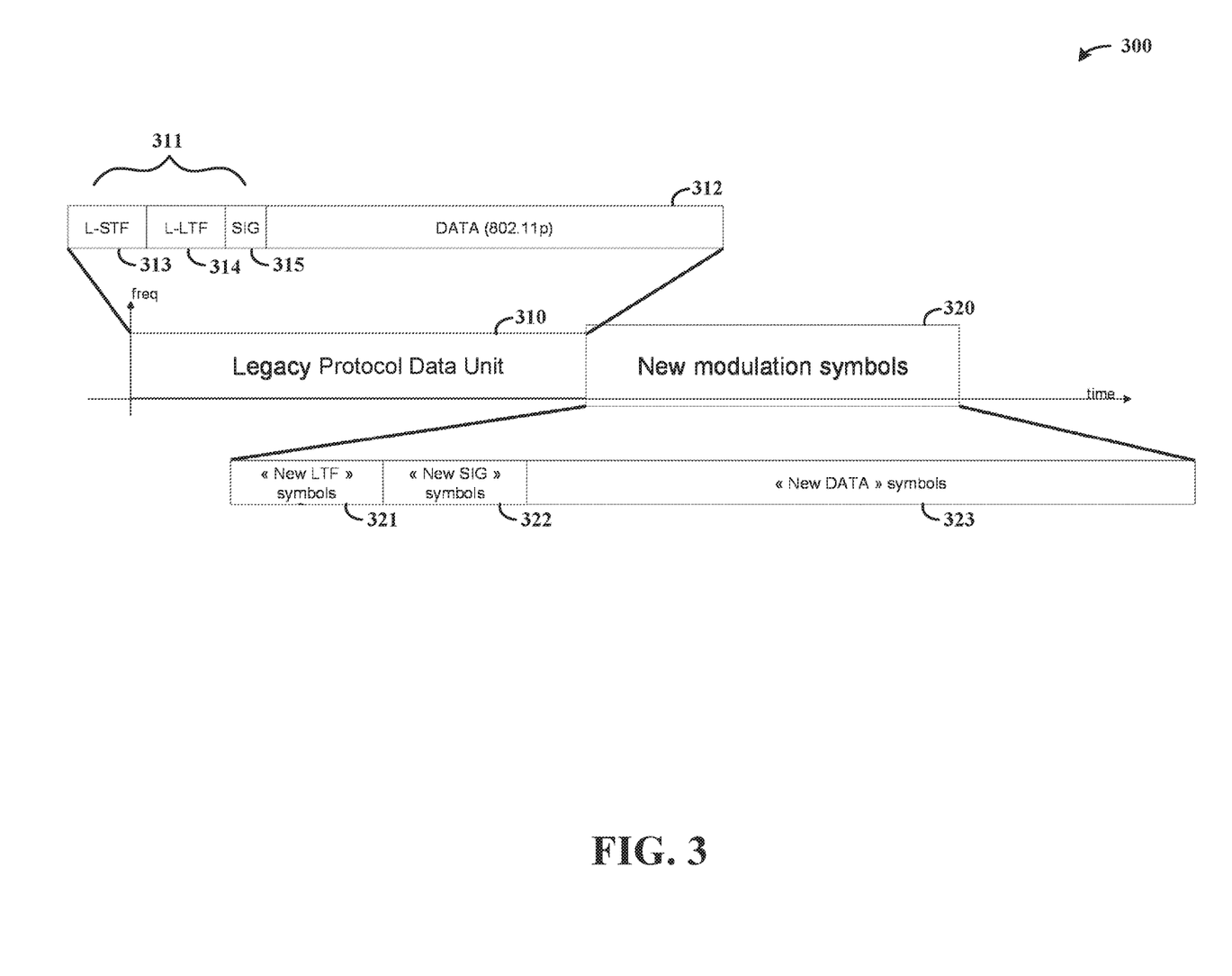
FIG. 3 illustrates an example data communication approach with different protocols, as may be implemented in accordance with one or more embodiments.

FIG. 3 illustrates an example data communication approach with different protocols, as may be implemented in accordance with one or more embodiments. Specifically, FIG. 3 shows a data communication 300 including a legacy protocol data unit (PDU) 310 and additional symbols 320 associated with another protocol, referred to by way of example as "new" protocol modulation symbols. The legacy PDU may be implemented with header data 311 and payload data 312. As shown by way of example, header data 311 includes a legacy short training field (L-STF) 313 that may provide support of synchronization and automatic gain control (AGC) calibration, a legacy long training field (L-LTF) 314 that may provide channel estimation, and a signal field (SIG) 315. Also shown by way of example, the payload data 312 may include and IEEE 801.11p MPDU (MAC Protocol Data Unit).

The additional symbols 320 may include symbols that correspond to one or more of a variety of other protocols. By way of example, such symbols 320 are shown as including new LTF-like symbols 321, new SIG-like symbols 322, and new data symbols 323. The new LTF-like symbols 321 may, for example, provide channel estimation, such as may be implemented in accordance with HT-LTF (high throughput-long training field, as may be implemented in accordance with the IEEE 801.11-2016 standard noted herein at 19.3.9.4.6) or VHT-LTF (very high throughput-long training field). The SIG-like symbols 322 may be implemented to carry parameters for decoding new data symbols, as may relate to legacy-SIG and/or may incorporate rate potions, MIMO (multi-input, multi-output) precoding options, and might be protected with a CRC (cyclic redundancy check) protection. The new data symbols 323 may be implemented for carrying an encoded payload, and may involve high throughput or very high throughput PPDU (e.g., in accordance with the IEEE 801.11-2016 standard), and which may involve LDPC (low-density parity check) options, STBC (space-time block code) options, various spatial streams, and a small GI (guard interval) option, but are not limited to this implementation.

FIG. 4 illustrates an example data communication and reception approach for different types of receivers, in accordance with one or more embodiments. Such receivers may, for example, be implemented in accordance with the environment characterized in connection with FIG. 1. PPDU 410 shows a format using both a legacy protocol and a new/other protocol (e.g., NGV format), such as may be implemented in a manner similar to that characterized with FIG. 3. The legacy section of the message is shown at 412, and the new/other section of the message is shown at 414, with the legacy section including an L-STF field 415, L-LTF field 416, SIG field 417 and data field 418.

PPDU 420 characterizes how a legacy receiver may treat the PPDU 410, with the legacy section of the message 412 being processed and the remaining new/other section of the message 422 interpreted as energy (e.g., high power) and may be understood by the receiver 420 as the channel being busy and therefore unavailable for transmission, although not containing useful decodable information for such receiver 420. PPDU 430 characterizes how a new/other protocol receiver may treat the PPDU 410, which may process the new/other section of the message 414 without using the legacy section of the message 412, or may process both sections of the message, either as two distinct standalone decoding process or as a joint decoding (for example by combining the channel estimates obtained from L-LTF symbols 314 and from new LTF-like symbols 321.

The size (e.g., length) of the legacy and other portions 412 and 414 of the PPDU 410 may be set in a variety of manners, driven by the state of the surrounding environment, such as characterized herein. In some implementations, a number of transmitter stations using a new communication protocol (NumStations$_{NGV}$) and a number of stations using a legacy communications protocol (NumStations$_{legacy}$) are used to derive a ratio. Specifically, NGV users measure NumStations$_{NGV}$ and NumStations$_{legacy}$, and derive a Tech$_{percentage}$ ratio as follows:

$$Tech_{percentage} = \frac{NumStations_{NGV}}{NumStations_{legacy} + NumStations_{NGV}}$$

In this context, NumStations$_{legacy}$ is the number of packets received over a time duration of one second time block code (TBC) originating from legacy 802.11p stations. NumStations$_{NGV}$ is the number of packets received over a time duration of one sec (TBC) originating from NGV stations. In some implementations, messages from NGV encoded in accordance with the legacy standard (e.g., as in state 501 in FIG. 5) are counted in NumStations$_{NGV}$ category, and not part of NumStations$_{legacy}$ stations. In this regard, the "reserved bit" can be used in L-SIG, or the new-LTF can be placed after the 802.11p legacy data symbols.

FIG. 5 illustrates respective communication states 501-506 as may be set in accordance with a dynamic relationship of information collected using respective communication protocols, in accordance with one or more embodiments. Consistent with the above, the size (e.g., length) of the legacy and other portions 412 and 414 of the PPDU 410 may be set in accordance with the approaches shown in FIG. 5. By way of example, FIG. 5 shows allocation of a communication in accordance with six different states, however more or fewer states may be used, or dynamic adjustment may be used, to suit particular embodiments. Referring to state 501, the entire allocation is made to legacy communications 510, as may be implemented when most or all other transmitters or transmissions in an environment are made with the legacy protocol. Additional LTF data 511 may be transmitted by communication stations to designate that, while that station may be communicating in a fully backward-compatible manner utilizing legacy communications, it is capable of communicating via the new/other protocol. As noted above, state 501 may be implemented where transmitters configured to operate using a new protocol are operating in accordance with the legacy protocol. Total packet duration in each state may be similar to a legacy 802.11p PDU encoded with QPSK ½ (rate 6 Mbps in a 10 MHz channel), as shown in state 501.

In various implementations, when a station using the new/other protocol transmits in a fully backwards compatible manner, other receiving stations that implement the new/other protocol (e.g., NGV) may identify such a station as new/other-protocol capable in a variety of manners. In some implementations, a new-LTF symbol may be transmitted within the section of the aggregated message pertaining to the new protocol. Receiving stations can therefore identify the new-LTF and derive the information that such message was in fact sent by a new-protocol-capable station. Other options are possible, such as setting some of the reserved bits of the legacy standard SIG in 311 to value of one, as opposed to them traditionally being set to zero in legacy 802.11p transmissions.

In states 502-505, an increasing amount of the communication is transmitted using symbols from the new/other communication protocol while the amount of the communication using symbols from the legacy communication protocol is decreased. The percentage allocation may vary to suit particular applications, with sections 520, 530, 540 and 550 allocated to communications using a legacy protocol, and sections 522, 532, 542, and 552 allocated to communications using new/other communication protocols. In addition, a type of modulation utilized may be varied as well, with exemplary modulation types for state 502 including quadrature phase-shift keying (¾), for state 503 including 16 quadrature amplitude modulation (½), for state 504 including 16 quadrature amplitude modulation (¾), and for state 505 including 64 quadrature amplitude modulation (⅔). State 506 is shown as allocating the entire communication to the new/other protocol 560 along with an STF 561 (and, e.g., with the legacy protocol L-LTF, SIG and DATA symbols, such as items 312, 314, and 315 from FIG. 3, fully removed). In certain situations, the STF (which can be detected by all stations) permits for common indication of station-to-station communications activity.

As characterized herein, discerning a current communication environment may involve a variety of approaches, such as utilizing computations as disclosed herein above (e.g., and discussion with FIG. 5). In various implementations, a lookup table is utilized, such as by detecting detect a certain number of stations operating with respective protocols (e.g., NGV stations and legacy stations), and looking up a corresponding allocation in a memory circuit. In some implementations, such discerning involves utilizing information or a directive provided from another station (e.g., as may be mobile or fixed) or from a network such as a central provider (e.g., automotive-based) of navigation assistance communicating over cellular or satellite networks.

Figure 6:
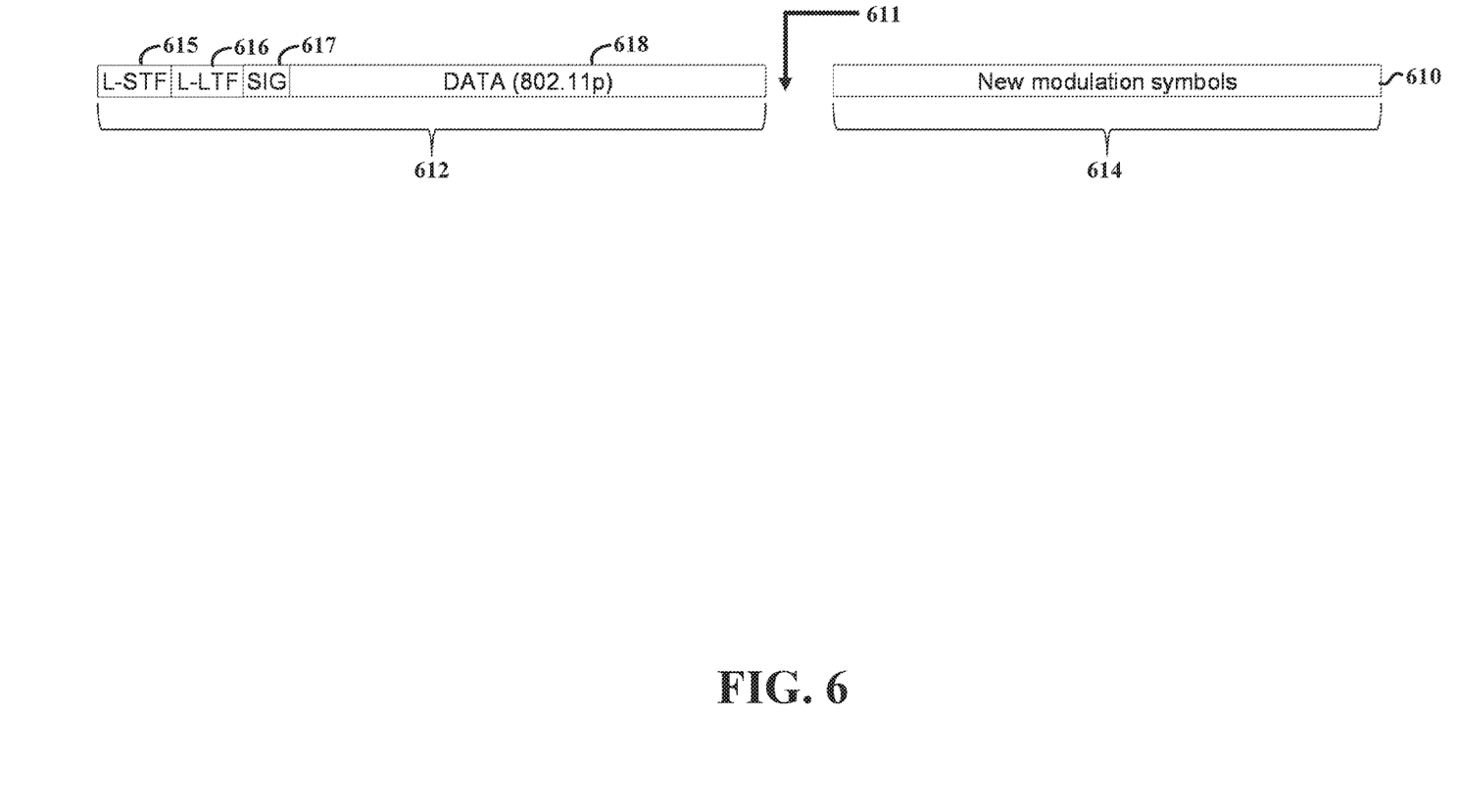
FIG. 6 illustrates an example data communication and reception approach implementing a gap between protocol data units, as may be implemented in accordance with one or more embodiments.

FIG. 6 illustrates an example data communication and reception approach implementing a gap between protocol data units, as may be implemented in accordance with one or more embodiments. A communication 610 shows a format using both a legacy protocol and a new/other protocol (e.g., NGV format), such as may be implemented in a manner similar to that characterized with FIGS. 3 and 4. The legacy section of the message is shown at 612, and the new/other section of the message is shown at 614, with a gap 611 between the legacy and new/other sections. Each section 612 and 614 may, for example, be implemented as separate PPDUs. The legacy section/PPDU 612 includes an L-STF field 615, L-LTF field 616, SIG field 617 and data field 618. This approach may, for example, facilitate fairness of legacy interoperability and/or flexibility in use of a wireless medium.

The gap 611 may be configured in time/length to suit particular applications. For instance, the configurable gap 611 may be set to zero for best efficiency. The configurable gap 611 may further be set to a relatively short interval such as in the existing 802.11 SIFS (short interframe space), such as to provide an amount of time needed for a wireless interface to process a received frame. A longer time interval may be utilized to allow another message to be sent between the respective legacy section 612 and new/other section 614. The total duration of the legacy section 612 and the new/other section 614, either with a zero time interval between them, or sent with a configurable gap time between them, can be set to a similar duration as the legacy IEEE 802.11p packet encoded with QPSK ½ (rate 6 Mbps).

Terms to exemplify orientation, such as upper/lower, left/right, top/bottom and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

The skilled artisan would recognize that various terminology as used in this disclosure (including claims) connote a plain meaning in the art unless otherwise indicated. As examples, aspects useful for implementing the claimed invention may be described and/or illustrated by way of various circuits or circuitry, using terms such as stations, blocks, modules, device, system, unit, controller, and/or other circuit-type depictions (e.g., reference numerals 220, 225, 232 of FIG. 2 depict a block/module as described herein). Such circuits or circuitry are used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches shown in the figures. In certain embodiments, such a programmable circuit is one or more computer circuits, which may include memory circuitry for storing and accessing a program to be executed as a set (or sets) of instructions (and/or to be used as configuration data to define how the programmable circuit is to perform), and an algorithm or process as described and/or claimed herein is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the disclosure may make reference to a legacy communication protocol and another communication protocol, or to related vehicular communications circuitry (e.g., first and second circuits) operating according to one or both protocols, terms such as first and second might be replaced with other terms such as legacy and other. Adjectives such as "first" and "second" are not used to connote any description of the structure or to provide any substantive meaning; rather, such adjectives are merely used for English-language antecedence to differentiate ones of such similarly-named structure from another similarly-named structure (e.g., "first circuit configured to broadcast . . . " is interpreted as "circuit configured to broadcast . . . ").

It is noted that the embodiments above have been described with reference to different subject-matter. In particular, some embodiments may have been described with reference to method-type features/aspects, whereas other embodiments may have been described with reference to an apparatus features/aspects. However, a person skilled in the art will gather from the above that, unless otherwise indicated, in addition to any combination of features/aspects belonging to one type of subject-matter, also any combination of features/aspects relating to different subject-matter, in particular a combination of features/aspects of the method-type subject-matter and features/aspects of the apparatus-type subject-matter, is considered to be disclosed with this document.

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, first vehicular communications circuitry can include more or less circuit components than those illustrated by FIG. 1 or 2, and/or different ordered circuit components. As another example, additional communication protocols may be utilized within a communication. Such modifications do not depart from the true spirit and scope of various aspects of the disclosure, including aspects set forth in the claims.

What is claimed is:

1. A method involving wireless station-to-station communications in which each of a plurality of stations shares a wireless communications channel, the method comprising:

in communications circuitry specific to a station participating in the station-to-station communications, collecting information wirelessly respectively from transmissions associated with a legacy communication protocol and from transmissions associated with another communication protocol;

dynamically discerning a current communication environment of the station that characterizes a dynamic relationship of the collected information using the legacy communication protocol relative to the collected information using the other communication protocol; and wirelessly transmitting communications from the communications circuitry over the wireless communications channel using the legacy communication protocol and using the other communication protocol, by allocating usage of the channel through transmissions of data via the legacy communication protocol or the other communication protocol, based on the dynamic relationship.

2. The method of claim 1, wherein:

dynamically discerning the current communication environment includes dynamically characterizing numbers of transmitters or messages in the environment that respectively utilize the legacy communication protocol and that utilize the other communication protocol as the environment changes, and allocating the usage of the channel includes dynamically allocating data symbols to the legacy communication protocol and to the other communication protocol in accordance with the dynamically characterized number of transmitters or messages using the respective protocols.

3. The method of claim 1, wherein:

dynamically discerning the current communication environment includes characterizing a number of transmitters or messages in the environment that communicate via the legacy communication protocol, and characterizing a number of transmitters or messages in the environment that communicate via the other communication protocol, and allocating the usage of the channel includes allocating a ratio of data symbols to the legacy communication protocol and to the other communication protocol based on a ratio of the number of transmitters that communicate with the legacy communication protocol to the number of transmitters that communicate using the other communication protocol, or based on a ratio of the number of messages that utilize the legacy communication protocol to the number of messages that utilize the other communication protocol.

4. The method of claim 1, wherein dynamically discerning the current communication environment includes characterizing an environmental condition selected from the group consisting of: a number of transmitters using the legacy communication protocol; a number of messages using the legacy communication protocol; a number of transmitters using the other communication protocol; a number of messages using the other communication protocol; time used to transmit messages of the legacy communication protocol; noise; speed of the station; geographic location of the environment; and type of station from which the transmissions emanate.

5. The method of claim 1, wherein allocating usage of the channel includes, for each communication wirelessly transmitted from the communications circuitry over the wireless communications channel:

temporally positioning data symbols of the legacy communication protocol and data symbols of the other communication protocol and adapting modulation and coding of the data symbols based on the dynamic relationship, or allocating a first portion of data symbols in the communication to a header and payload in accordance with the legacy communication protocol, and allocating a second portion of data symbols in the communication to a header and payload in accordance with the other communication protocol that utilizes both the legacy communication protocol and a different communication protocol.

6. The method of claim 1, wherein:
dynamically discerning the current communication environment includes dynamically characterizing numbers of transmissions in the environment that respectively use the legacy communication protocol and use the other communication protocol, and dynamically characterizing numbers of transmitters in the environment that respectively use the legacy communication protocol and use the other communication protocol, and
allocating the usage of the channel includes:
allocating data symbols to the legacy communication protocol and to the other communication protocol based on the numbers of transmissions and the numbers of transmitters using the respective protocols, or
allocating data symbols to the legacy communication protocol and to the other communication protocol based on the numbers of transmissions and the numbers of transmitters using the respective protocols by associating the transmissions with respective ones of the transmitters based on information in the transmissions and allocating the data symbols based on the number of transmitters.

7. The method of claim 1, wherein wirelessly transmitting the communications from the communications circuitry over the wireless communications channel using the legacy communication protocol and using the other communication protocol includes transmitting a common data set having data discernable by stations using the legacy communication protocol and by stations using the other communication protocol.

8. The method of claim 1, wherein:
collecting the information wirelessly includes collecting transmitter identification information from each transmission; and
dynamically discerning the current communication environment includes using the transmitter identification information to distinguish ones of the transmissions emanating from different transmitters.

9. The method of claim 1, wherein the other communication protocol uses the legacy communication protocol, and wherein wirelessly transmitting the communications from the communications circuitry over the wireless communications channel using the legacy communication protocol and using the other communication protocol includes communicating different sets of data with respective headers and payloads within a common communication.

10. The method of claim 1, wherein:
the plurality of stations include at least one station having communications circuitry that transmits over the wireless communications channel using the legacy communication protocol and at least one station having communications circuitry that transmits over the wireless communications channel using the other communication protocol;

collecting the information wirelessly includes receiving transmissions using the legacy communication protocol and receiving transmissions using the other communications protocol; and
wirelessly transmitting the communications from the communications circuitry includes transmitting a common data packet to stations using the legacy communication protocol and to stations using the other communication protocol.

11. The method of claim 1, wherein allocating the usage of the channel includes transmitting a communication having a first protocol data unit of the legacy communication protocol and a second protocol data unit of the other communication protocol by transmitting the respective first and second protocol data units successively with a configurable gap in time therebetween.

12. The method of claim 1, wherein wirelessly transmitting communications from the communications circuitry over the wireless communications channel using the legacy communication protocol and using the other communication protocol includes transmitting a protocol data unit according to the legacy protocol and transmitting an additional symbol indicating that the source of the transmission is capable of communicating using the other communication protocol.

13. An apparatus for wireless station-to-station communications in which each of a plurality of stations shares a wireless communications channel, the apparatus comprising:
communications circuitry specific to a station participating in the station-to-station communications, the communications circuitry being configured to:
collect information wirelessly respectively from transmissions associated with a legacy communication protocol and from transmissions associated with another communication protocol, and
dynamically discern a current communication environment of the station that characterizes a dynamic relationship of the collected information using the legacy communication protocol relative to the collected information using the other communication protocol; and
transmission circuitry to wirelessly transmit communications from the communications circuitry over the wireless communications channel using the legacy communication protocol and using the other communication protocol, by allocating usage of the channel through transmissions of data via the legacy communication protocol or the other communication protocol, based on the dynamic relationship.

14. The apparatus of claim 13, wherein:
the communications circuitry is to dynamically discern the current communication environment by dynamically characterizing numbers of transmitters or messages in the environment that respectively utilize the legacy communication protocol and that utilize the other communication protocol as the as the environment changes; and
the transmission circuitry is to allocate the usage of the channel by dynamically allocating data symbols to the legacy communication protocol and to the other communication protocol in accordance with the dynamically characterized number of transmitters or messages using the respective protocols.

15. The apparatus of claim 13, wherein the transmission circuitry is to:
allocate the usage of the channel by transmitting a communication having a first protocol data unit of the legacy communication protocol and having a second protocol data unit of the other communication protocol by transmitting the respective first and second protocol data units successively with a configurable gap in time therebetween, or wirelessly transmit the communications over the wireless communications channel by transmitting a protocol data unit according to the legacy protocol and transmitting an additional symbol indicating that the source of the transmission is capable of communicating using the other communication protocol.

16. The apparatus of claim 13, wherein the communications circuitry is to dynamically discern the current communication environment by characterizing an environmental condition selected from the group consisting of: a number of transmitters using the legacy communication protocol; a number of messages using the legacy communication protocol; a number of transmitters using the other communication protocol; a number of messages using the other communication protocol; time used to transmit messages of the legacy communication protocol; noise; speed of the station; geographic location of the environment; and type of station from which the transmissions emanate.

17. The apparatus of claim 13, wherein the transmission circuitry is to allocate the usage of the channel by, for each communication wirelessly transmitted from the communications circuitry over the wireless communications channel:

temporally positioning data symbols of the legacy communication protocol and data symbols of the other communication protocol and adapting modulation and coding of the data symbols based on the dynamic relationship, or allocating a first portion of data symbols in the communication to a header and payload in accordance with the legacy communication protocol, and allocating a second portion of data symbols in the communication to a header and payload in accordance with the other communication protocol that utilizes both the legacy communication protocol and a different communication protocol.

18. The apparatus of claim 13, wherein the communications circuitry is to dynamically discern the current communication environment by dynamically characterizing numbers of transmissions in the environment that respectively use the legacy communication protocol and use the other communication protocol, and dynamically characterizing numbers of transmitters in the environment that respectively use the legacy communication protocol and use the other communication protocol, and allocating the usage of the channel by:

allocating data symbols to the legacy communication protocol and to the other communication protocol based on the numbers of transmissions and the numbers of transmitters using the respective protocols, or allocating data symbols to the legacy communication protocol and to the other communication protocol based on the numbers of transmissions and the numbers of transmitters using the respective protocols by associating the transmissions with respective ones of the transmitters based on information in the transmissions and allocating the data symbols based on the number of transmitters.

19. The apparatus of claim 13, wherein the transmission circuitry is to wirelessly transmit communications from the communications circuitry over the wireless communications channel using the legacy communication protocol and using the other communication protocol, by transmitting a common data set having data discernable by stations using the legacy communication protocol and by stations using the other communication protocol.

20. The apparatus of claim 13, wherein the transmission circuitry is to wirelessly transmit communications from the communications circuitry over the wireless communications channel using the legacy communication protocol and using the other communication protocol, by transmitting a protocol data unit according to the legacy protocol and transmitting an additional symbol indicating that the source of the transmission is capable of communicating using the other communication protocol.

* * * * *